June 3, 1958

H. S. BANCROFT 2,837,115

FLUID PRESSURE CONTROLLING VALVE

Filed Oct. 9, 1956

INVENTOR.
Howard S. Bancroft
BY
ATTORNEY.

June 3, 1958 H. S. BANCROFT 2,837,115
FLUID PRESSURE CONTROLLING VALVE

Filed Oct. 9, 1956 2 Sheets-Sheet 2

INVENTOR.
Howard S. Bancroft
BY
ATTORNEY.

United States Patent Office 2,837,115
Patented June 3, 1958

2,837,115

FLUID PRESSURE CONTROLLING VALVE

Howard S. Bancroft, Sharon, Pa.

Application October 9, 1956, Serial No. 614,974

3 Claims. (Cl. 137—620)

This invention relates to valves and more particularly to a valve suitable for controlling hydraulic fluid as in connection with the operation of a servomotor.

The principal object of the invention is the provision of a fluid pressure controlling valve of simple and inexpensive construction which will operate efficiently in controlling hydraulic fluid under pressure.

A further object of the invention is the provision of a fluid pressure controlling valve which incorporates a single external control means which operates a plurality of valve elements in the valve.

A still further object of the invention is the provision of a fluid pressure controlling valve in which the valve elements and the valve seat elements are interchangeable and readily replaceable.

A still further object of the invention is the provision of a fluid pressure controlling valve in which a plurality of apertured disc-like valve elements are rotatably engaged on a plurality of apertured disc-like valve seat elements and arranged so that hydraulic pressure biases said rotatable elements toward the said valve seat elements.

The fluid pressure controlling valve disclosed herein comprises an improvement in the art of hydraulic control valves and particularly those adapted to be used for controlling and directing hydraulic fluids under pressure toward and away from servomotors and the like.

Such servomotor control valves have heretofore generally comprised spindle valves which are slidable longitudinally in cylindrical housings. Such valves, although efficient, require careful machining and exact gasket provisions in order to remain effective.

In the present invention the valve elements and valve seat elements need only be formed with flat abutting surfaces to be completely effective and no gaskets are required between the moving parts.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figures 1, 2:
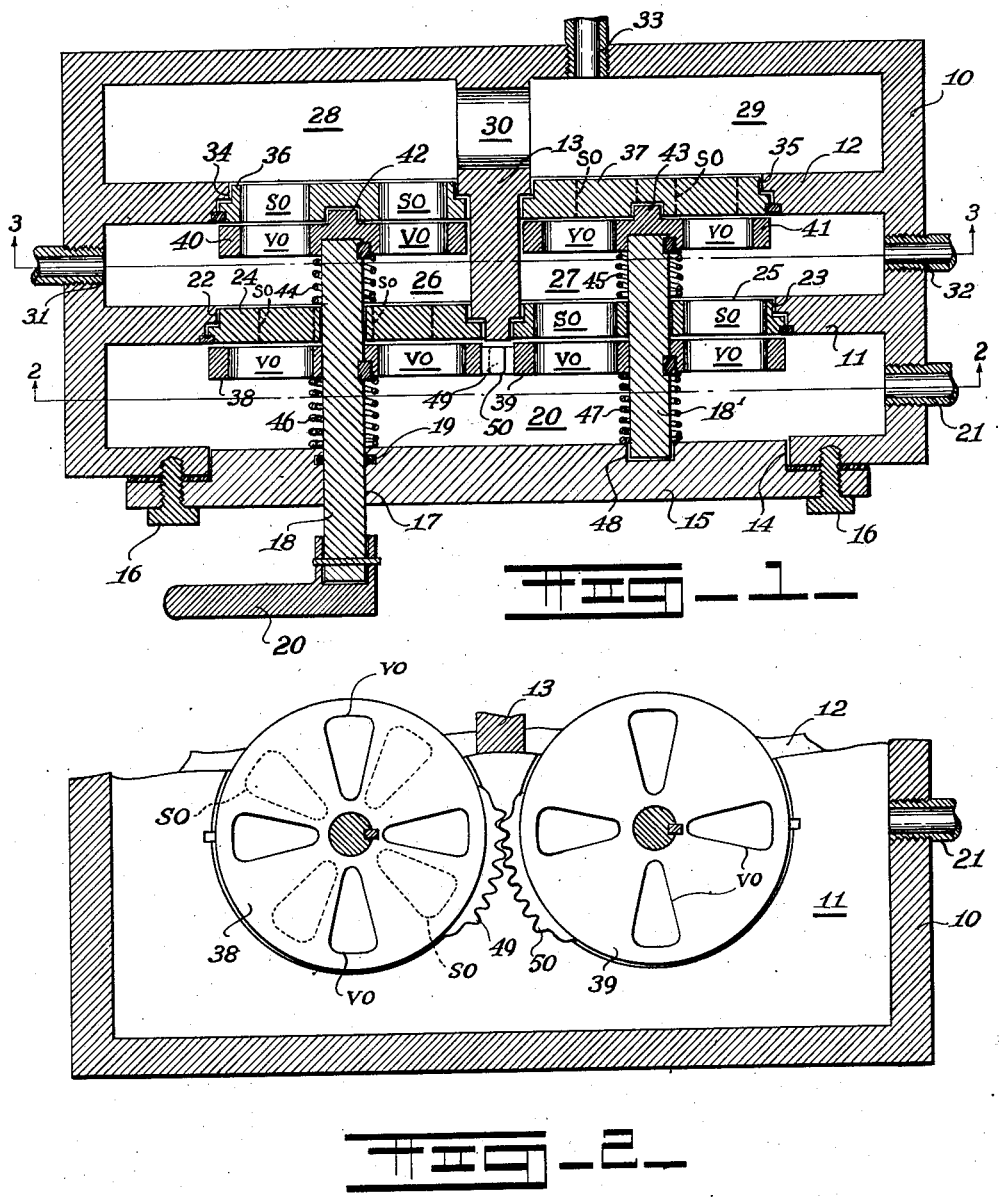
Figure 1 is a top plan view of the fluid pressure controlling control valve.
Figure 2 is a vertical section taken on line 2—2 of Figure 1.

By referring to the drawings and Figure 1 in particular it will be seen that the control valve comprises a housing 10 which is divided into several compartments by a plurality of partitions 11, 12 and 13. The housing 10 has an access opening 14 in its front wall, which opening is normally closed by a closure 15 secured by a plurality of fasteners 16—16.

The closure 15 is apertured as at 17 and a valve stem 18 is positioned therethrough in movable relation and sealed with respect thereto by an O-ring gasket 19. A handle 20 on the valve stem 18 provides means for rotating the valve stem 18.

The partition 11 is positioned in spaced parallel relation to the closure 15 and with the same defines an inlet chamber 20 into which hydraulic fluid under pressure may be introduced as through an inlet opening and fitting 21.

The partition 11 has two circular flanged openings 22 and 23, respectively, therein and each of these openings 22 and 23 has a circular valve seat element 24 and 25, respectively, positioned therein and held against rotation.

The area of the partition 11 between the openings 22 and 23 comprises a side portion of the partition 13 which extends in a right angle direction away from the partition 11 so as to divide the area within the housing 10 and on the opposite side of the partition 11 from the chamber 20 into right and left halves, respectively, which are in turn transversed by the partition 12. Thus, chamber 26 and 27 are formed between the partitions 11 and 12 and chambers 28 and 29 are formed between the partition 12 and the spaced back wall of the housing 10. In this connection it will be observed that a passageway 30 is provided in the partition 13 to establish communication between the chambers 28 and 29.

Figure 4:
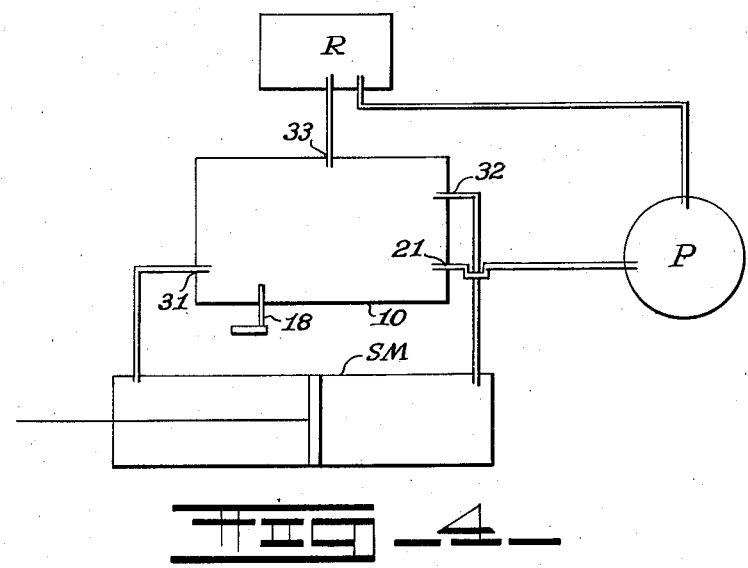
Figure 4 is a symbolic diagram showing the fluid pressure controlling valve in connection with a servomotor and a source of fluid power.

The chambers 26 and 27 have outlet openings and fittings 31 and 32 which communicate by way of tubular means with opposite ends of a servomotor, as best seen in symbolic diagram in Figure 4 of the drawings wherein the servomotor is indicated by the letters SM.

The chamber 29, and hence the chamber 28, is provided with an outlet opening and fitting 33 which establishes communication with a reservoir R, as seen in Figure 4 of the drawings, from which reservoir R a pump P, as in Figure 4, is supplied with hydraulic fluid which in turn is delivered under pressure to the inlet opening and fitting 21, heretofore referred to as being in communication with the chamber 20.

By referring again to Figure 1 of the drawings it will be seen that the partition 12 is provided with a pair of spaced circular openings 34 and 35 and that a pair of valve seat elements 36 and 37 are disposed therein and held against rotation.

Figure 3:
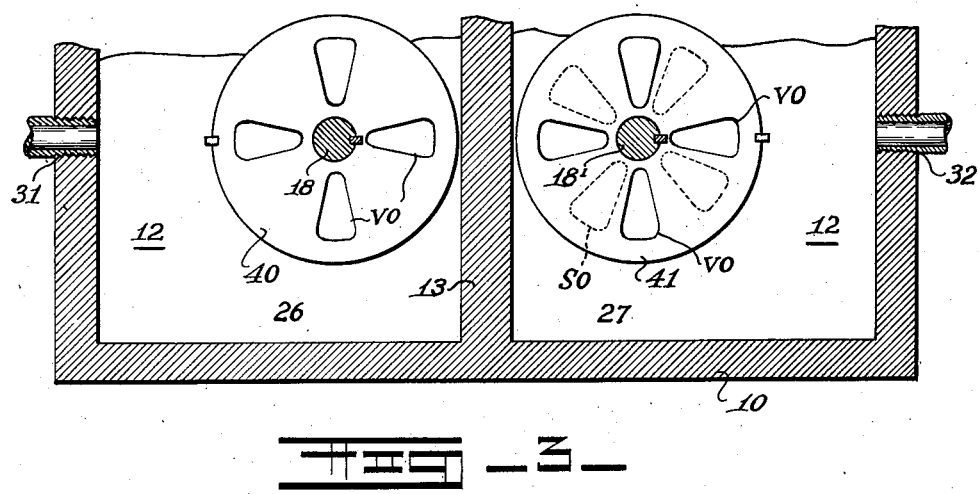
Figure 3 is a vertical section taken on line 3—3 of Figure 1.

Each of the valve seat elements 24 and 25, 36 and 37, is provided with four circumferentially spaced radially extending openings SO, as seen in solid lines in the valve seat element 25 in Figure 1 of the drawings, and in dotted lines in Figures 2 and 3 of the drawings.

A pair of rotatable disc-like valve elements 38 and 39 are positioned in the chamber 20, one on each of the valve seat elements 24 and 25, heretofore referred to, and are held in such position by the valve stem 18 and a secondary valve stem 18' which are keyed in centrally disposed openings in said rotatable disc-like valve elements 38 and 39, respectively.

Each of the valve elements 38 and 39 is provided with a plurality of circumferentially spaced, radially extending openings VO and which openings may be seen in Figures 1 and 2 of the drawings.

It will be observed that the valve stem 18 and secondary valve stem 18' extend through centrally disposed openings in the valve seat elements 24 and 25 and into the chambers 26 and 27, respectively, where they engage and are keyed to a second pair of rotatable disc-like valve elements 40 and 41. The secondary valve elements 40 and 41 are also provided with a plurality of circumferentially spaced, radially extending openings VO. The valve elements 40 and 41 are positioned against the valve seat elements 36 and 37, see Figures 1 and 3 of the drawings.

Each of the valve elements 40 and 41 is provided with a centrally disposed boss 42 and 43, respectively, each of which engage a matching depression in the valve seat elements 36 and 37, respectively, so that the valve elements 40 and 41 are held in desirable rotatable position with respect thereto.

Tensioning springs 44 and 45 are positioned about the valve stem 18 and secondary valve stem 18' and between the valve seat elements 24 and 25 and the valve elements 40 and 41, respectively.

Tensioning springs 46 and 47 are positioned about the valve stem 18 and secondary valve stem 18' and between the closure 15 and the valve elements 38 and 39, respectively. It will also be seen that a depression 48 is formed in the inner surface of the closure 15 to journal the outer end of the valve stem 18'.

By referring to Figures 1 and 2 of the drawings it will be seen that the valve elements 38 and 39 are each provided with a section of matching gear teeth 49 and 50, respectively, which are engaged so that rotating motion imparted the valve element 38, as by manual movement of the valve stem 18, will impart similar but opposite rotative movement to the valve element 39 and the valve stem 18'. The movement of the valve stem 18 will also rotate the valve element 40 and the valve element 41 will be rotated by the secondary valve stem 18'.

It will thus be seen that when the valve elements 38 and 39, 40 and 41 are in the positions illustrated in Figures 1, 2 and 3 of the drawings, fluid pressure admitted to the chamber 20 by way of the inlet opening and fitting 21 will not pass through the openings VO and SO in the valve element 38 and valve seat element 24, respectively, as the openings VO and SO are not in engagement (see Figure 2 of the drawings), but that such fluid pressure will pass through the openings VO and SO in the valve element 39 and the valve seat element 25 as the openings VO and SO, respectively, therein are in alignment (see Figure 2 of the drawings).

Thus, the fluid pressure will flow only into the chamber 27 from whence it may flow outwardly through the outlet opening and fitting 32 to one end of the servomotor, as seen in Figure 4 of the drawings. This occurs because the openings VO in the valve element 41 in the chamber 27 are not in engagement with the openings SO in the valve seat element 37 (see Figure 3 of the drawings).

Hydraulic fluid from the opposite end of the servomotor will, therefore, be delivered into the chamber 26 (see Figures 1 and 3 of the drawings) and it will flow through the aligned openings VO and SO in the valve element 40 and valve seat element 36 (see Figures 1 and 3 of the drawings), into the chamber 28, through the passageway 30 in the partition 13, into the chamber 29 and outwardly through the outlet opening and fitting 33 to the reservoir R, as seen in Figure 4 of the drawings. This occurs because the openings VO and SO in the valve element 38 and valve seat element 24 in the partition 11 are in non-registering relation as are the openings VO and SO in the valve element 41 and valve seat element 37 in the partition 12 (see Figures 1 and 3 of the drawings).

At such time as the valve stem 18 is rotated so as to impart similar but opposite rotating movement to the valve elements 38, 39, 40 and 41, the relative positions of the valve elements 38, 39, 40 and 41 will be reversed with respect to the stationary valve seat elements 24, 25, 36 and 37 so that hydraulic fluid under pressure entering the chamber 20 through the inlet fitting 21 will flow through the then matching openings VO and SO in the valve element 38 and valve seat element 24, respectively, and outwardly through the outlet fitting 31 to the servomotor.

The return flow from the servomotor will enter the outlet fitting 32, flow into the chamber 27 and through matching openings VO and SO in the valve element 41 and valve seat element 37, respectively, and into the chamber 29 which is in communication with the reservoir R by way of the outlet fitting 33.

Those skilled in the art will observe that a simple and efficient hydraulic control valve has been disclosed which efficiently and quickly provides suitable control for servomotors and the like wherein the directional control of hydraulic fluids under pressure is essential.

Those skilled in the art will also observe that the housing of the valve may be of any desired material and that the partitions therein need not be machine-finished with the minor exception of the openings 22, 23, 34 and 35 therein in which the valve seat elements 24, 25, 36 and 37 are positioned, and that such machining in this instance may be largely dispensed with if suitable gaskets, as known in the art, are employed as there is no motion between the valve seat elements and their supporting structures.

The valve seat elements and the valve elements which are rotatably engaged thereagainst under tension may obviously be formed of easily machined metal such as brass and will be self-seating in relation to one another while at the same time providing a relatively inexpensive construction.

It will be observed that the valve elements and valve seat elements are so arranged that fluid pressure introduced into the valve tends to urge said elements into closer relation thereby insuring an effective seal between the same.

It will thus be seen that the several objects of the invention are met by the fluid pressure controlling valve disclosed herein.

Having thus described my invention, what I claim is:

1. A fluid pressure controlling valve comprising a housing subdivided into a plurality of chambers by a plurality of partitions, openings formed in said partitions, and valve seat elements disposed one in each of said openings, said valve seat elements having circumferentially spaced, radially positioned openings therein, a plurality of valve elements rotatably positioned one on each of said valve seat elements, said valve elements having circumferentially spaced, radially positioned openings therein, said valve elements arranged with respect to said valve seat elements so that the openings in two pairs of said valve and valve seat elements are in alignment simultaneously and the openings in the other two pairs are out of alignment, means interconnecting said valve elements for imparting motion thereto, said means comprising valve stems disposed through said valve elements and keyed thereto and gear teeth formed on engaging peripheral surfaces of at least two of said valve elements.

2. A fluid pressure controlling valve comprising a housing subdivided into a plurality of chambers by a plurality of partitions, openings formed in said partitions, and valve seat elements disposed one in each of said openings, said valve seat elements having circumferentially spaced, radially positioned openings therein, a plurality of valve elements rotatably positioned one on each of said valve seat elements, said valve elements having circumferentially spaced, radially positioned openings therein, said valve elements arranged with respect to said valve seat elements so that the openings in two pairs of said valve and valve seat elements are in alignment simultaneously and the openings in the other two pairs are out of alignment, means interconnecting said valve elements for imparting motion thereto, said means comprising valve stems disposed through said valve elements and keyed thereto and gear teeth formed on engaging peripheral surfaces of at least two of said valve elements, and wherein spring means is disposed between said housing and said valve elements and between said valve seat elements and others of said valve elements for tensioning the valve elements with respect to the valve seat elements.

3. A fluid pressure controlling valve comprising a housing subdivided into a plurality of chambers by a plurality of partitions, openings formed in said partitions, and valve seat elements disposed one in each of said openings, said valve seat elements having circumferentially spaced, radially positioned openings therein, a plurality of valve elements rotatably positioned one on each of said valve seat elements, said valve elements having circumferentially spaced, radially positioned openings therein, said valve elements arranged with respect to said valve seat elements so that the openings in two pairs of said valve and valve seat elements are in alignment simultaneously and the openings in the other two pairs are out of alignment, means interconnecting said valve elements for imparting motion thereto, said means comprising valve stems disposed through said valve elements and keyed thereto and gear teeth formed on engaging peripheral surfaces of at least two of said valve elements, and wherein the valve seat elements are flanged discs disposed in flanged openings in said partitions, and wherein said valve elements are discs and the abutting faces of said valve elements and valve seat elements are flat.

References Cited in the file of this patent
UNITED STATES PATENTS 1,425,086   Geer ------------------ Aug. 8, 1922